R. B. Norrell,
Halter,
N° 23,939. Patented May 10, 1859.
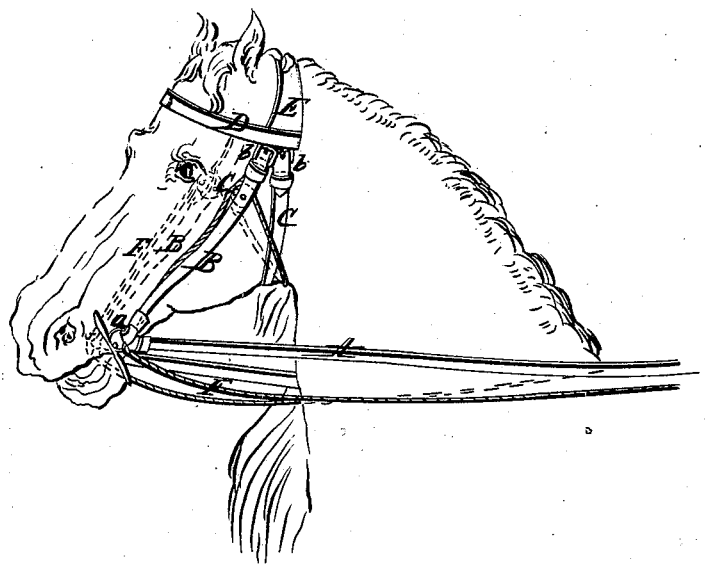
Witnesses:
Inventor:

UNITED STATES PATENT OFFICE.

R. B. NORVELL, OF HUNTSVILLE, ALABAMA.

BRIDLE.

Specification of Letters Patent No. 23,939, dated May 10, 1859.

*To all whom it may concern:*

Be it known that I, R. B. NORVELL, of Huntsville, in the county of Madison and State of Alabama, have invented a new and useful Improvement in Choking-Straps; and I do hereby declare that the following is a full, clear, and exact description of the same, reference being had to the accompanying drawing, making a part of this specification.

The drawing represents a side elevation of my choking-strap together with the bridle as applied to a horse.

The object of this invention is to prevent horses or other draft animals from breaking the bridle or rein, and the invention consists in passing a round strap or cord through the bit ring on one side and up over a pulley or through a loop and down under the animal's throat and up on the other side of the head to a similar pulley or loop and down through the bitring, the two ends to be united behind the animal's neck, so that when the same makes an attempt to break his bridle or rein the slightest strain on this additional cord is sufficient to check the animal so as to make the same perfectly quiet.

To enable those skilled in the art to fully understand, use, and construct my invention I will proceed to describe it.

A, is the bridle or rein which is attached to the bitrings $a$, $a'$, and which is fastened to the horse's head by the straps B, B', together with the throat strap C, and the straps D, and E, in the usual manner. These several straps are united by means of buckles $b$, so as to adapt the same to different sized heads and so as to be able to fasten them readily. Pulleys $c$, $c'$, are inserted into the straps B, B', near to the upper ends of the same and in such a position that when the rein or bridle is attached to the horse, the pulleys are nearly in height with the eyes of the horse or other animal to which the same may be attached, as clearly represented in the drawing, and an additional strap or cord F, is drawn through the bit ring $a$, and over the pulleys $c$, and down under the animal's throat and up again on the other side of the head over the pulley $c'$, and down through the bit ring $a'$, and the two ends of this cord are united behind the animal's neck. Instead of using pulleys in the straps B, and B', simple loops can be used through which the additional cord F, is passed. I prefer however to use pulleys as they offer less resistance to the motion of the cord. If the horse or other animal is now tied to a post by the bridle or rein, and if the additional cord is also wound around the post leaving the same slack however so as not to affect the horse when he is quiet and orderly, and if the horse makes now an attempt to break the bridle or rein, a slight strain on the additional cord will begin to choke the horse and keep him quiet, so that if the bridle or rein gives way the horse is prevented from running away by the cord F. And this cord is of equal advantage if the horse wants to run away whether under the saddle or in harness, if the rider or the driver keeps hold of the cord, for if the horse should begin to get unruly the slightest strain on the cord F, will show him that his master is on or behind his back. It is obvious that this cord can be combined with a halter in the same manner.

What I claim as new and desire to secure by Letters Patent, is,

The cord F, attached to a bridle or halter by passing the same through the bit rings or halter rings and over the pulleys $c$, $c'$, or their equivalents and under the throat of a horse or other animal substantially as and for the purpose herein described.

R. B. NORVELL.

Witnesses:
E. L'ROY ANTONY,
I. H. LARCOMBE.